US006987578B2

(12) United States Patent
Alexander

(10) Patent No.: US 6,987,578 B2
(45) Date of Patent: Jan. 17, 2006

(54) PRINTER PRIORITY BIDDING SCHEME

(75) Inventor: Richard Alexander, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1035 days.

(21) Appl. No.: 09/814,258

(22) Filed: Mar. 21, 2001

(65) Prior Publication Data

US 2002/0135796 A1 Sep. 26, 2002

(51) Int. Cl.
*G06F 15/00* (2006.01)
(52) U.S. Cl. ........................................ 358/1.15; 705/37
(58) Field of Classification Search .......... 358/1.1–1.9, 358/1.11–1.18; 705/37
See application file for complete search history.

(56) References Cited

U.S. PATENT DOCUMENTS 5,982,994 A * 11/1999 Mori et al. ................. 358/1.15
6,650,433 B1 * 11/2003 Keane et al. ............... 358/1.15

FOREIGN PATENT DOCUMENTS

EP 0820185 1/1998
JP 10320156 12/1998

* cited by examiner

*Primary Examiner*—King Y. Poon

(57) ABSTRACT

Printing priority is ascertained according to a bidding process that allows users to submit bids along with their print jobs. The printer orders the print jobs from highest to lowest bid. This allows individual users to determine the importance of each print job. If urgent, the user can submit a higher bid to place the print job at the top of the queue ahead of print jobs deemed less important by the users that submitted them. Prioritizing the print jobs according to user submitted bids allows the printer to better reflect the urgencies and printing needs of all users.

32 Claims, 3 Drawing Sheets

PRINTER PRIORITY BIDDING SCHEME

TECHNICAL FIELD

The present invention is directed to printers, and more particularly, to methods for prioritizing print jobs based on bids.

BACKGROUND

In the network environment, it is common for multiple users to share one or more printers on a network. Traditionally, user computers submit print jobs over the network to a printer, and that printer places the print job in a queue. The print jobs are subsequently printed in the order they appear in the queue. In this manner, the printer inherently assigns priority to print jobs on a first-in-first-out (FIFO) basis.

When many users share the same printer resources, there are times when different users have different priority needs. For instance, one user might have a rush job that requires immediate printing, while other users have no time constraints. Unfortunately for the first user, with traditional FIFO-based priority, the rush print job is queued and printed in order, even though other print jobs ahead in the queue may not have any time constraints and could easily be postponed until after the rush job is completed. The fact that the first user places great importance on printing their print job as fast as possible goes unnoticed by the printer, resulting in an impatient and often frustrated user.

Accordingly, there is a need for an improved printing scheme in the networked printing environment that prioritizes print jobs according to the importance ascribed by individual users.

SUMMARY

Printing priority is ascertained according to a bidding process that allows users to submit bids along with their print jobs. The printer orders the print jobs from highest to lowest bid. This allows individual users to assess the importance of each print job. If urgent, the user can submit a higher bid to place the print job at the top of the queue ahead of print jobs deemed less important by the users that submitted them. By reordering the printer queue according to the bids, the printer improves network printing by better accommodating the ever-changing printing needs of all users.

In one implementation, a network printing system includes multiple user computers connected to one or more printers via a network. Individual user computers are equipped with a printer module that stores pre-allocated print tokens to be used in bidding for printing priority. The printer module also presents a user interface that allows a user to specify an initial bid of tokens as well as a maximum bid that the user is willing to spend to gain the best priority. When the print job is initiated, the user computer submits the print job along with the initial and maximum bids.

A prioritizing module resides at the printer to prioritize the currently queued print jobs. The print jobs are first prioritized according to the number of print tokens bid for the print jobs. If two or more print jobs have identical bids, the prioritizing module attempts to increase the bids of each print job (until they reach their maximum bid) in an attempt to find a winning bid. If multiple print jobs still end up in a tie, the print jobs are secondarily prioritized according to a second criterion, such as time received, user seniority, user proximity to the printer, and so on.

BRIEF DESCRIPTION OF THE DRAWINGS

The same reference numbers are used throughout the figures to reference like components and features.

DETAILED DESCRIPTION

Printing priority is ascertained according to a bidding process that allows users to submit bids along with their print jobs. The printer orders the print jobs from highest to lowest bid. This allows individual users to assess the importance of their print job. If urgent, the user can submit a higher bid to place the print job at the top of the queue ahead of print jobs deemed less important by the users that submitted them. Prioritizing the print jobs according to user submitted bids allows the printer to better reflect the urgencies and printing needs of all users.

Although the following discussion unfolds in the context of printers, the bid-based priority system may be utilized with other devices that queue job requests, such as scanners, photocopiers, and the like.

Network Printing System

Figure 1:
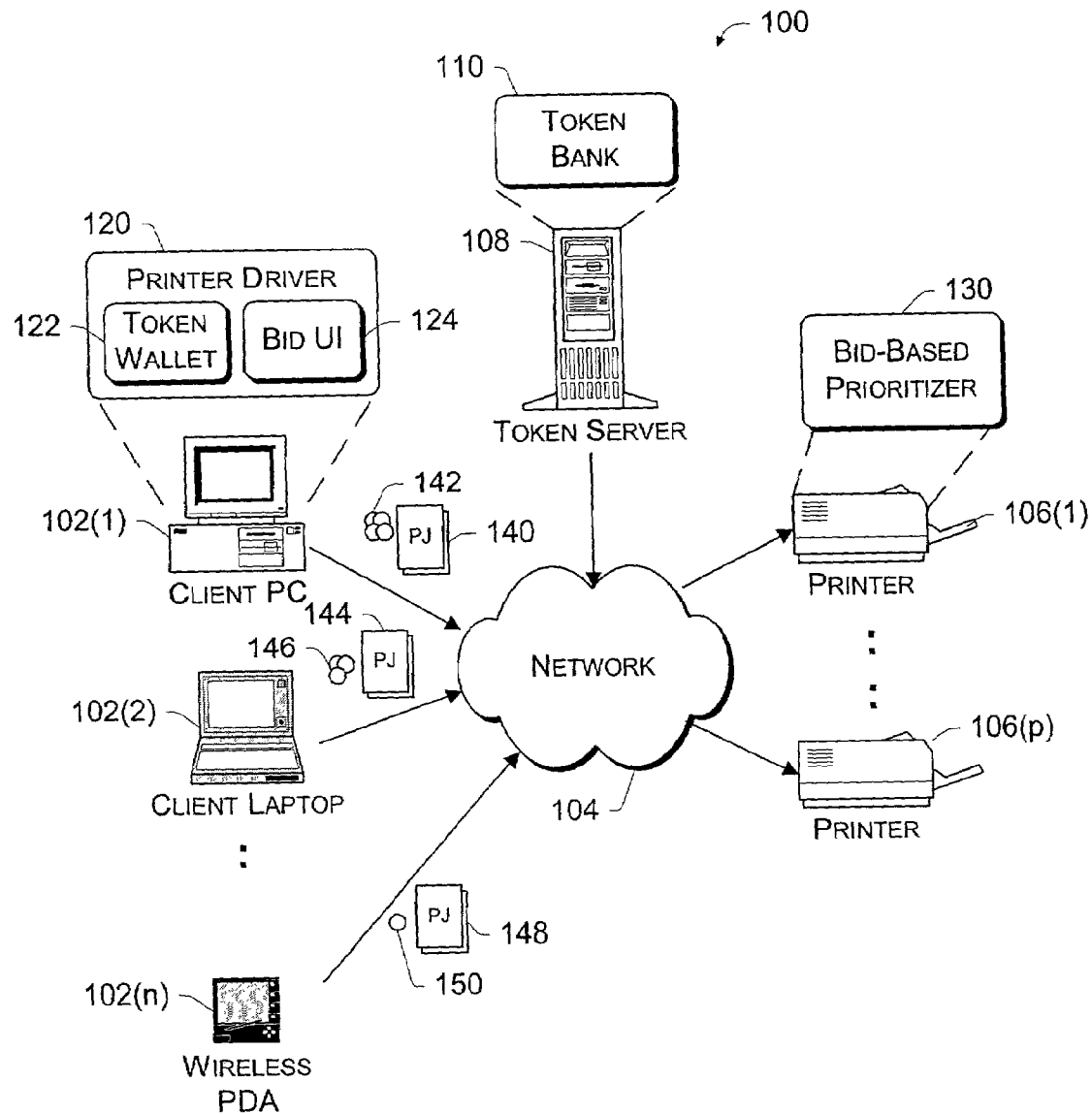
FIG. 1 illustrates a network printing system that implements a bidding-based priority system for prioritizing print jobs.

FIG. 1 shows an exemplary network printing system 100 in which multiple user computing devices 102(1), 102(2), . . . , 102(n) are connected via a network 104 to one or more printers 106(1), . . . , 106(p). The system 100 implements a bidding process for prioritizing print jobs sent from the user computing devices 102 to the printers 106.

The network 104 represents diverse types of networks, including public networks (e.g., Internet, etc.) and private networks (e.g., intranet, local area network, wide area network, etc.). The network 104 may be implemented using a variety of technologies, including wire-based technologies (e.g., fiber optic, cable, etc.) and wireless technologies (e.g., RF, Bluetooth, IR, cellular, etc.).

The user computing devices 102 may be implemented as any of a variety of computer types, including the illustrated desktop personal computer 102(1), laptop 102(2), and wireless PDA (portable digital assistant) 102(n). Other possible types of computing devices include notebook computers, palmtop computers, cellular phones, workstations, and the like. User computing devices may further include other types of consumer electronics that are capable of printing, such as digital cameras, scanners, and the like.

The printers 106 may be implemented as different types of printing systems, such as laser printers, inkjet printers, dot matrix printers, and so on. Furthermore, as noted above, the printers 106 are representative of other devices that queue job requests from multiple users, such as scanners, photocopiers, and the like.

A token server 108 is also connected to the network 104. The token server 108 implements a token bank 110 that generates digital tokens to be used as currency in the bidding process. The token server 108 allocates tokens to each user computing device 102 on a periodic (e.g., daily, weekly, monthly, etc.) or occasional basis. The number of tokens allocated to individual users and the allocation timing may be based on any number of different policies, including seniority, employee position, proximity to the printer, etc. In one implementation, the token server 108 automatically allocates a deficit number of tokens to each user computing device 102 to bring the balance of tokens back to a predetermined number. Additionally, the tokens may be configured to expire after a set period, such as a month. In this manner, the token server 108 can automatically allocate a predefined number of tokens to a user computing device 102 each period, knowing that the tokens will either be used or expire by the end of the period.

The tokens may be implemented in many different ways. If theft or duplication is not anticipated, the tokens may be a simple digital value or count that is decremented as the user computing devices uses them to bid for printer priority. On the other hand, if theft or duplication is anticipated, the tokens may be cryptographically generated and assigned to individual user computing devices so that each token is unique and traceable. In this latter case, the tokens may be returned to the token server for evaluation of fraudulent expenditure.

Each user computing device 102 is equipped with a printer driver 120. For purposes of implementing the bidding system, the otherwise conventional driver 120 is modified with a token wallet 122 to store the tokens allocated by the token server 108 and a bid user interface (UI) 124 that enables the user to enter bids for individual print jobs.

Each printer 106 is equipped with a bid-based prioritizer 130. The prioritizer 130 examines print jobs in the printer queue and awards priority based on two criteria. First, the print jobs are ordered based on the number of tokens bid by the user. The print job with the highest bid is given highest priority in the queue. The print job with the next most tokens is granted second highest priority, and so on.

When multiple print jobs bid the same number of tokens, resulting in a tie under the first criterion, the prioritizer uses a second criterion to break the tie among the multiple print jobs. The second criterion may be implemented in multiple ways, such as awarding priority to the first print job received, or granting priority based on user seniority or physical proximity to the printer 106, or assigning priority according to some other heuristic.

The two-tier prioritizing process reflects the continually changing printing needs of various network users. In FIG. 1, for example, suppose the user of client PC 102(1) needs to print a document very quickly and thus submits a print job (PJ) 140 with a bid of four tokens 142. About the same time, the user of client laptop 102(2) is also pressed for time and decides to send a print job 144 with a bid of three tokens 146. The user of the wireless PDA 102(n), however, does not place any importance on priority and thus forwards a print job 148 with a bid of one token 150. In this example, the printer 106 will award top priority to the print job 140 with a bid of four tokens 142, second priority to the print job 144 with a bid of three tokens 146, and last priority to print job 148 with a bid of one token 150.

Figure 2:
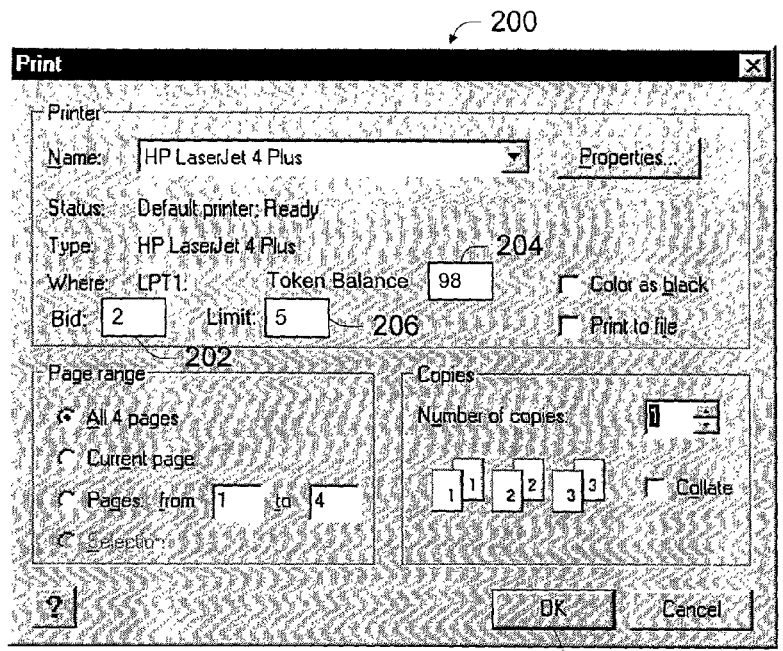
FIG. 2 illustrates a graphical user interface window that permits users to bid tokens for their print jobs.

Each user enters their bid via the bid UI 124. FIG. 2 shows an exemplary graphical window 200 presented by the bid UI 124 when the user is ready to submit a print job to the printer 106. The window 200 includes a bid field 202 that allows the user to enter the number of tokens for the print job. The more tokens entered, the greater the chance of being awarded first priority and being moved to the top of the queue. The window 200 also has a token balance field 204 that list the number of tokens remaining in the wallet 122.

The window 200 may be optionally equipped with a limit field 206 that allows the user to place a maximum number of tokens that they are willing to bid in the event that other users out bid the initial bid. In this example, the user enters an initial bid of two tokens, but is willing to bid as much as five tokens if another user outbids two tokens. After the bid is entered, the user clicks the "OK" button 208 to submit the print job and the bid to the designated printer 106.

The printer 106 receives the various print jobs and bids, and places them in a queue. Initially, the print jobs may be queued in the order in which they were received and subsequently rearranged. Alternatively, the print jobs may be temporarily stored elsewhere and examined to determine their priority before they are put in the queue.

Figure 3:
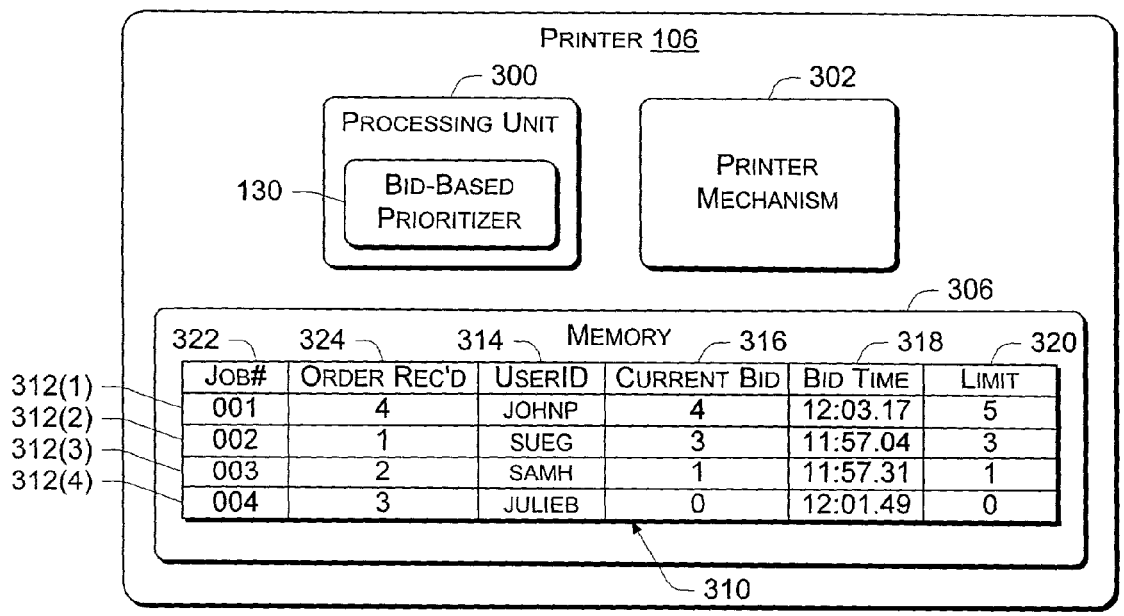
FIG. 3 is a block diagram of a printer employed in the network printing system and configured to prioritize print jobs according to bids submitted by the users.

FIG. 3 shows the printer 106 in more detail. The printer 106 is equipped with a processing unit 300, a printer mechanism 302, and a memory 304. The bid-based prioritizer 130 is shown located at the processing unit 300 to demonstrate that it might be implemented in hardware as part of the processing chip, or it may be software/firmware that executes on the processing unit 300.

A queue 310 is stored in memory 304. The queue 310 holds the print jobs received from user computers over the network. In this example, the queue 310 contains four print jobs 312(1)-312(4). For each print job, the queue 310 lists several fields, including a userID field 314 to identify the user, a bid field 316 that specifies the user's bid for that print job, a bid time field 318 that notes when the print job was received, and a limit field 320 that identifies the upper bid limit. Additionally, the queue 310 has an order received field 322 that tracks the order in which the print jobs were received and a job number field 324 that shows the current priority given to the print jobs.

The bid-based prioritizer 130 evaluates the print jobs in the queue and prioritizes them based on their bids (and, if necessary, secondarily on another criterion). In the FIG. 3 example, the first print job 312(1) was actually received last, but due to the highest bid of four tokens was moved to the top of the queue. The second print job 312(2) was actually received first, but since the user only bid three tokens with an upper limit of three tokens, it could not compete with the first print job's bid of four tokens. Hence, the first-filed print job was bumped in favor of the later-filed print job that bid more tokens.

When a print job is currently outbid, the prioritizer 130 automatically increases the bid for that print job one token at a time until the bid either becomes the top bid in the queue or reaches its upper limit specified in limit field 320. To illustrate this feature, suppose that the first print job 312(1) shown at the top of the queue 310 is originally submitted as a bid of two tokens as illustrated in UI 200 of FIG. 2. When the printer 106 receives that bid, it is initially prioritized behind another print job 312(2) with a higher bid of three tokens.

When attempting to prioritize the print job 312(1), the prioritizer 130 determines that the bid may be increased to four tokens without exceeding the upper limit of five tokens and automatically increases the bid. The prioritizer 130 also examines the other print job 312(2) and ascertains that it cannot be increased because it is already at its upper limit of three tokens. Thus, the later-filed print job 312(2) is given top priority.

The prioritizer 130 may also be configured to use fewer tokens than are bid. This is particularly useful in those cases where the bid beats any current bids by more than one token or there are no other print jobs in the queue. For instance, consider the situation where a user with a rush job submits a bid of five tokens, but the highest bid of any print jobs in the queue is only two tokens. In this case, the user's print job will be processed first due to its high bid. Notice, however, that the user's job would still be processed first with a lower bid that exceeds two tokens. Accordingly, the prioritizer 130 automatically reduces the number of tokens expended to process the print job to the lowest value that still carries out the user's intention. Here, the prioritizer 130 reduces the bid to three tokens. Furthermore, had there been no print jobs at all, the prioritizer 130 may automatically reduce the number of tokens to zero.

Once the print jobs are completed, the printer 106 may optionally report back to the user computers the actual number of tokens expended to process the print job. These amounts are then deducted from the token wallet 122 at the respective user machines. If the tokens are cryptographically generated, they may be either destroyed at the printer 106 or reported back to the token server 108 to track whether users are legitimately spending their tokens or are fraudulently double spending them.

Modifications may be made to the above-described architecture. For example, in one alternative implementation, the printer 106 may be configured to store the tokens and track token usage on behalf of the user. This alternative would eliminate the use of the token wallet 122 at the user computers 102. As another alternative, the printer 106 itself may be configured to allocate tokens to individual user accounts maintained at the printer 106, thereby removing the function of the token server 108 in this modified architecture.

Method

Figure 4:
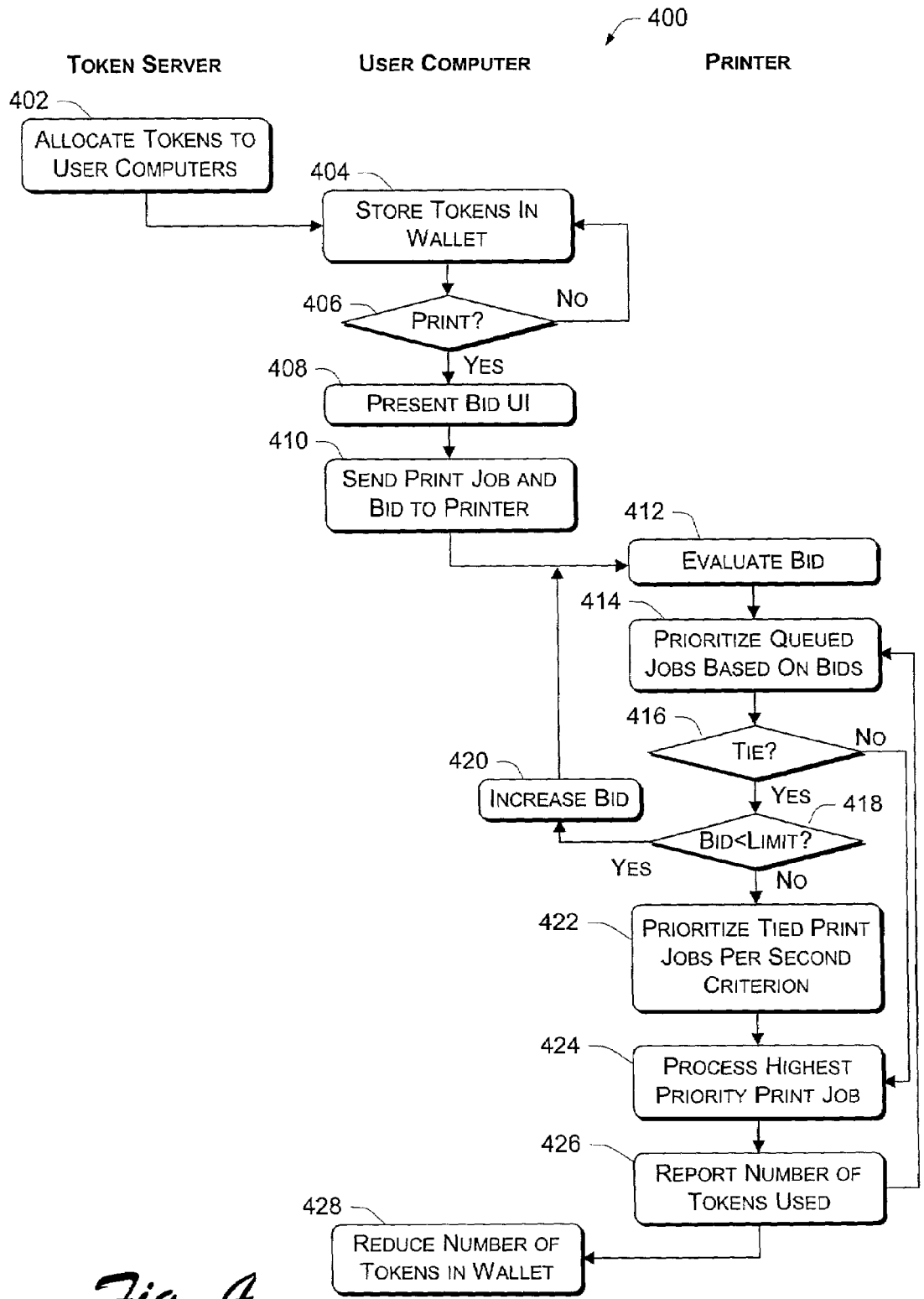
FIG. 4 is a flow diagram of a process for assigning priority to print jobs based on user bids.

FIG. 4 shows a process for assigning priority to print jobs based on bidding. The process 400 covers operations performed at various components of the printer priority bidding system and hence, the blocks in FIG. 4 are arranged beneath headings to identify exemplary components that perform such operations. The process 400 may be implemented in software, or a combination of hardware and software. As such, certain operations illustrated as blocks in FIG. 4 may represent computer-executable instructions that, when executed, direct the server, user computing devices, or printer to perform those operations.

At block 402, the token server 108 allocates tokens to the user computing devices. Again, this allocation may be performed occasionally, periodically, as needed, or according to whatever policy established by the system administrator. The number of tokens allocated to each user may be constant or varied.

At block 404, the user computing device 102 stores the allocated tokens in the token wallet 122. When the user decides to print a document or other job (i.e., the "yes" branch from block 406), the bid UI 124 presents a print window, such as window 200 in FIG. 2, that allows the user to enter the number of tokens that he/she wishes to bid for this print job (block 408). The user effectively places an importance on the print job by bidding more or less tokens.

The user computing device 102 may be configured to ensure that the user does not enter more tokens than are currently in the wallet 122. Alternatively, the user computing device 102 may allow the user to bid tokens to multiple printers in the hopes of finding one printer available even though there are not enough tokens in the wallet to cover the bids. In this case, when one printer accepts the bid and begins printing, the user computing device quickly retracts the bid(s) made to any other printers.

After the user enters an acceptable bid and initiates the printing process, the user computing device 102 sends the print job and the bid to the designated printer 106 via network 104 (block 410).

The printer 106 receives the print job and stores the print job in its queue or some other temporary memory location. At block 412, the bid-based prioritizer 130 evaluates the bid by comparing it to the bids of other jobs in the queue. The bid-based prioritizer 130 then prioritizes the print jobs in the queue from highest bidder to lowest bidder (block 414).

If two print jobs bid the same token value, resulting in a tie (i.e., the "yes" branch from block 416), the prioritizer 130 determines whether one (or both) of the bids in current bid field 316 is at its maximum limit noted in the limit field 320 (block 418). If a bid has not yet reached its limit, the prioritizer 130 automatically increases the bid for that print job (block 420) and reevaluates the queue one more time.

If the tying bids cannot be reconciled through increasing the number of tokens, the prioritizer 130 prioritizes the print jobs with the same bid according to the second criterion, such as first received, seniority of user, proximity to printer, etc. (block 422). At block 424, the printer processes the print job with the highest priority.

Once that print job is processed, the printer 106 may optionally report the number of tokens expended by the user (block 426). The user computer reduces the balance in the token wallet 122 by the number returned by the printer 106 (block 428).

Conclusion

Although the invention has been described in language specific to structural features and/or methodological acts, it is to be understood that the invention defined in the appended claims is not necessarily limited to the specific features or acts described. Rather, the specific features and steps are disclosed as exemplary forms of implementing the claimed invention.

I claim:

1. A method comprising:
    receiving multiple print jobs for printing in a first order, the print jobs having associated bids; wherein the bids specify a current bid and a maximum bid, and further comprising, in an event multiple print jobs have identical bids, increasing a bid of at least one print job without exceeding the maximum bid; and
    prioritizing the print jobs according to their associated bids so that the print jobs are printed in a second order different than the first order.

2. A method as recited in claim 1, wherein the prioritizing comprises granting higher priority to the print jobs with higher associated bids.

3. A method as recited in claim 1, further comprising, in an event that a set of multiple print jobs have identical bids, prioritizing the set of multiple print jobs according to a second criterion.

4. In a network printing system in which multiple user computers are networked to a common printer, a method comprising:
    allocating print tokens to the user computers;
    presenting a user interface at a user computer to facilitate entry of a bid for a print job, the bid specifying a number of prints tokens; wherein the user interface further facilitates entry of a maximum number of print tokens that the user is willing to bid, and further comprising increasing the bid without exceeding the maximum number of print tokens in an event that another print job has a higher bid;
    sending the print job together with the bid to the printer;
    prioritizing the print jobs at the printer according to their associated bids; and
    processing the print jobs.

5. In a network printing system in which multiple user computers are networked to a common printer, a method comprising:

allocating print tokens to the user computers;
presenting a user interface at a user computer to facilitate entry of a bib for a print job, the bid specifying a number of print tokens;
sending the print job together with the bid to the printer;
prioritizing the print jobs at the printer according to their associates bids;
processing the print jobs; and
reducing, at the user computer, the number of print tokens available for bidding by the number of print tokens used in the bid.

6. A method as recited in claim 5, wherein the allocating comprises:
generating the print tokens at a server; and
serving the print tokens to the user computers.

7. A method as recited in claim 5, wherein the print tokens have a predefined expiration.

8. A method as recited in claim 5, further comprising utilizing one or more fewer print tokens than are specified in the bid for a particular print job in an event that the priority of the particular print job is not affected.

9. A method as recited in claim 5, wherein the prioritizing comprises granting higher priority to the print jobs with higher associated bids.

10. A method as recited in claim 5, further comprising, in an event that a set of multiple print jobs have identical bids, prioritizing the set of multiple print jobs according to a second criterion.

11. A method as recited in claim 5, further comprising reporting to the user computer an actual number of print tokens expended to process the print job.

12. In network environment in which user computing devices submit job requests to another device for processing, a method comprising:
enabling users to submit bids with their job requests; wherein the enabling comprises permitting a user to specify a maximum bid so that their original bid may be increased to an increased bid that does not exceed the maximum bid in order to gain priority over a job request with a bid that is higher than the original bid; and
prioritizing the job requests according to their associated bids.

13. A method as recited in claim 12, wherein the enabling comprises presenting a user interface that facilitates user entry of the bids.

14. A method as recited in claim 12, wherein the prioritizing comprises granting higher priority to the job requests with higher associated bids.

15. A method as recited in claim 12, further comprising, in an event that a set of multiple job requests with identical bids exists, prioritizing the set of multiple job requests according to a second criterion.

16. A network printing system comprising:
a least one printer;
multiple user computing devices configured to submit print jobs to the printer over a network, wherein individual user computing devices comprise a user interface that facilitates user entry of an initial bid and a maximum bid that the user is willing to bid in an event that another print job has a bid that is higher than the initial bid;
the multiple user computing devices computing devices being further configured to enable associated users to submit bids with their print jobs; and
the printer being configured to prioritize the print jobs according to their associated bids.

17. A network printing system as recited in claim 16, wherein individual user computing devices comprise a user interface that facilitates user entry of a bid.

18. A network printing system as recited in claim 16, wherein, in an event that multiple print jobs have identical bids, the printer is further configured to prioritize the multiple print jobs according to a second criterion.

19. A network printing system as recited in claim 16, wherein the bids are measured in tokens, and the printer is further configured to allocate tokens for the user computing devices to use in the bids.

20. A network printing system as recited in claim 16, wherein the bids are measured in tokens, further comprising a token server configured to allocate tokens to the user computing devices for use in the bids.

21. A network printing system as recited in claim 16, wherein the bids are measured in tokens, and the printer is further configured to report the number of tokens used to process the print jobs back to the user computing devices.

22. A printer comprising:
a queue to store print jobs; and
a bid-based prioritizer to prioritize the print jobs in the queue according to bids submitted in association with the print jobs, wherein the bids include an initial bid value and a maximum bid value, and the bid-based prioritizer is further configured to increase the bid of a print job from its initial bid value up to the maximum bid value in an attempt to gain priority over another print job with a bid that is initially higher than the initial bid value.

23. A printer comprising:
a queue to store print jobs; and
a bid-based prioritizer to prioritize the print jobs in the queue according to bids submitted in association with the print jobs, wherein the bids are measured in tokens and the bid-based prioritizer is further configured to utilize one or more fewer tokens than specified in a bid for a particular print job so long as priority of the particular print job is not affected.

24. A printer as recited in claim 23, wherein, in an event that multiple print jobs have identical bids, the bid-based prioritizer is further configured to prioritize the multiple print jobs according to a second criterion.

25. An architecture comprising:
a printer module resident at a user computer that presents a user interface to allow a user to bid a number of print tokens for a print job; wherein the user interface permits the user to specify a maximum bid along with an original bid, and the prioritizing module increases the number of print tokens from its original bid up to the maximum bid in an event that another print job has a bid that is initially higher than the original bid; and
a prioritizing module resident at a printer that prioritizes print jobs currently queued at the printer on the number of print tokens bid for the print jobs.

26. An architecture as recited in claim 25, wherein the print tokens are allocated to the user computer, and the printer module comprises a token wallet to store the print tokens.

27. An architecture as recited in claim 25, wherein, in an event that multiple print jobs have identical bids, the prioritizing module is configured to prioritize the multiple print jobs according to a second criterion.

28. An architecture as recited in claim 25, further comprising a token server resident at a server computer that allocates to tokens to the printer module at the user computer.

29. An architecture comprising:
a printer module resident at a computer that presents a user interface to allow a user to bid a number of print tokens for a print job; and
a prioritizing module resident at a printer that prioritizes print jobs currently queued at the printer based on the number of print tokens bid for the print jobs, wherein the bids are measured in tokens and the bid-based prioritizer is further configured to utilize one or more fewer tokens than specified in the bid so long as priority of the print job is not affected.

30. One or more computer-readable media comprising computer-executable instructions that when executed, direct a printer to:
queue print jobs; and
prioritize the print jobs according to bids submitted in association with the print jobs, wherein the bids specify an initial bid and a maximum bid, and further comprising computer-executable instructions that, when executed, direct a printer to increase the initial bid of a print job without exceeding the maximum bid to gain higher priority for the print job.

31. One or more computer-readable media as recited in claim 30, further comprising computer-executable instructions that, when executed, direct a printer to prioritize print jobs with identical bids according to a second criterion.

32. One or more computer-readable media as recited in claim 30, wherein the bids are measured in tokens, and further comprising computer-executable instructions that, when executed, direct a printer to utilize one or more fewer tokens than specified in a bid for a particular print job if said fewer tokens are sufficient to process the particular print job without affecting priority.

* * * * *

UNITED STATES PATENT AND TRADEMARK OFFICE
CERTIFICATE OF CORRECTION

PATENT NO. : 6,987,578 B2
APPLICATION NO. : 09/814258
DATED : January 17, 2006
INVENTOR(S) : Alexander It is certified that error appears in the above-identified patent and that said Letters Patent is hereby corrected as shown below:

Col. 8 (line 54), after "printer", insert --based--.

Signed and Sealed this

Eighth Day of August, 2006

JON W. DUDAS
*Director of the United States Patent and Trademark Office*